(12) United States Patent
Ingalls

(10) Patent No.: US 12,018,711 B1
(45) Date of Patent: Jun. 25, 2024

(54) TWO-PIECE FASTENER

(71) Applicant: Edwin Ingalls, The Villages, FL (US)

(72) Inventor: Edwin Ingalls, The Villages, FL (US)

( * ) Notice: Subject to any disclaimer, the term of this patent is extended or adjusted under 35 U.S.C. 154(b) by 0 days.

(21) Appl. No.: 18/210,130

(22) Filed: Jun. 15, 2023

(51) Int. Cl.
  *F16B 5/02* (2006.01)
  *F16B 39/30* (2006.01)

(52) U.S. Cl.
  CPC .............. *F16B 5/02* (2013.01); *F16B 39/30* (2013.01)

(58) Field of Classification Search
  CPC ........ F16B 5/02; F16B 21/084; F16B 21/086; F16B 37/014; F16B 37/043–045; F16B 39/30; Y10S 411/913
  USPC .................................. 411/172, 173, 508–510
  See application file for complete search history.

(56) References Cited

U.S. PATENT DOCUMENTS

| | | | | |
|---|---|---|---|---|
| 3,740,083 A | * | 6/1973 | Zenhausern | F16B 9/05 |
| | | | | 403/243 |
| 4,048,898 A | | 9/1977 | Salter | |
| 4,850,778 A | * | 7/1989 | Clough | F16B 37/0842 |
| | | | | 411/324 |
| 4,981,735 A | * | 1/1991 | Rickson | F16B 39/225 |
| | | | | 428/338 |
| 5,069,586 A | * | 12/1991 | Casey | F16B 5/01 |
| | | | | 411/908 |
| 5,197,840 A | * | 3/1993 | Peek | F16B 37/0842 |
| | | | | 411/433 |
| 5,254,016 A | * | 10/1993 | Ganthier | H01R 12/714 |
| | | | | 411/339 |
| 5,387,065 A | * | 2/1995 | Sullivan | F16B 19/1081 |
| | | | | 411/48 |
| 5,616,052 A | * | 4/1997 | Pan | H01R 12/7047 |
| | | | | 439/573 |
| 5,966,782 A | * | 10/1999 | Ishihara | F16B 21/06 |
| | | | | 24/297 |
| 6,095,733 A | | 8/2000 | Busby et al. | |
| 6,123,492 A | * | 9/2000 | Pickard | B65D 19/0095 |
| | | | | 411/339 |
| 6,325,582 B1 | | 12/2001 | Sadri et al. | |
| 6,345,946 B1 | * | 2/2002 | Mainini | F16B 21/086 |
| | | | | 411/339 |
| 10,941,796 B2 | | 3/2021 | Rassam et al. | |
| 2017/0284434 A1 | * | 10/2017 | Lopez | F16B 5/01 |

FOREIGN PATENT DOCUMENTS

GB 1381917 A 1/1975

* cited by examiner

*Primary Examiner* — Roberta S Delisle
(74) *Attorney, Agent, or Firm* — Jason T. Daniel, Esq.; Daniel Law Offices, P.A.

(57) ABSTRACT

A two-piece fastener used to combine two substrates of the same or differing thickness. The fastener may include a bolt portion and a locking base. The bolt portion and locking base may include complimentary sets of teeth that mechanically engage with one another when the bolt is passed through the two substrates and affixed to the locking base.

13 Claims, 3 Drawing Sheets

TWO-PIECE FASTENER

TECHNICAL FIELD

The embodiments generally relate to devices for fixing two materials together.

BACKGROUND

Attaching materials of same and/or differing thicknesses, particularly where the thicknesses are substantially different from one another, creates difficulties that few if any existing reusable attachment means address.

SUMMARY

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

The disclosed fastener includes a two-piece assembly used to combine two substrates of the same or varying thickness. The fastener may include a bolt portion and a locking base. The bolt portion and locking base may include complimentary teeth that mechanically engage with one another when the bolt is passed through the two substrates and affixed to the locking base.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

Figure 1:
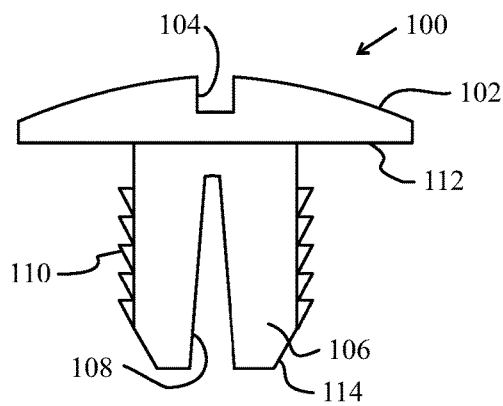
FIG. 1 illustrates a portion of a two-piece fastener according to some embodiments.

The drawings are not necessarily to scale, and certain features and certain views of the drawings may be shown exaggerated in scale or in schematic in the interest of clarity and conciseness.

DETAILED DESCRIPTION

The specific details of the single embodiment or variety of embodiments described herein are to the described system and methods of use. Any specific details of the embodiments are used for demonstration purposes only and no unnecessary limitations or inferences are to be understood from there.

It is noted that the embodiments reside primarily in combinations of components and procedures related to the system. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The disclosed fastener includes a two-piece fastener used to combine two substrates of the same or varying thickness. The fastener may include a bolt portion and a locking base. The bolt portion and locking base may include complimentary teeth that mechanically engage with one another when the bolt is passed through the two substrates and affixed to the locking base.

The bolt portion may include a stem and head similar to a traditional bolt. The neck may define a channel constructed and arranged to vary the size of the neck when engaged with the locking base. A first set of teeth may be arranged on the neck and may be constructed and arranged to engage with a second set of teeth on the locking base.

The locking base may include a flange connected to a generally cylindrical tube having the second set of teeth arranged internally within the tube. The flange may define through holes constructed and arranged to affix the flange to a substrate, such as via riveting.

Figure 2:
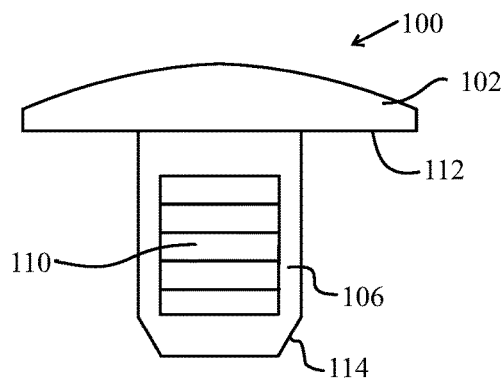
FIG. 2 illustrates a portion of a two-piece fastener according to some embodiments.
Figure 3:
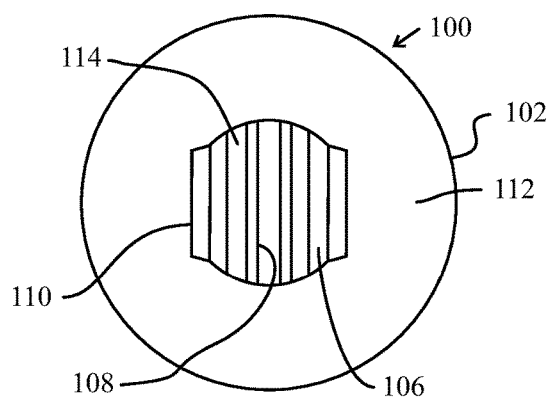
FIG. 3 illustrates a portion of a two-piece fastener according to some embodiments.

FIGS. 1 through 3 illustrate a portion of a two-piece fastener including a bolt 100. The bolt 100 may include a cap 102 which may define a tightening cavity 104 constructed in arranged to receive a tool such as a screwdriver or driver. The cap 102 may have a bottom face 112 joined to a neck 106. The neck 106 may define a compression channel 108 constructed and arranged to allow the neck to reduce diameter when forced into a through hole or similar opening. The neck 106 may further include a beveled end 114 to further facilitate insertion of the neck into a through hole. The neck 106 may include a first set of teeth 110 on opposite sides of the neck 106. The first set of teeth 110 may be on opposite sides of the neck 106, as best seen in FIG. 3 and may be constructed and arranged to engage with a second set of teeth depicted as 210 in FIG. 4, and which may also be constructed and arranged to disengage with the second set of teeth when the bolt 100 is rotated such that the first set of teeth 110 and the second set of teeth are no longer mechanically engaged with one another. In this way, the bolt may be configured to quickly engage with a locking base (depicted in FIGS. 4-6) via engagement of the first set of teeth and second set of teeth. Additionally, the bolt may be configured to quickly disengage from the locking base by rotating the bolt relative to the locking base such that the first set of teeth and second set of teeth are no longer mechanically engaged with one another.

Figure 4:
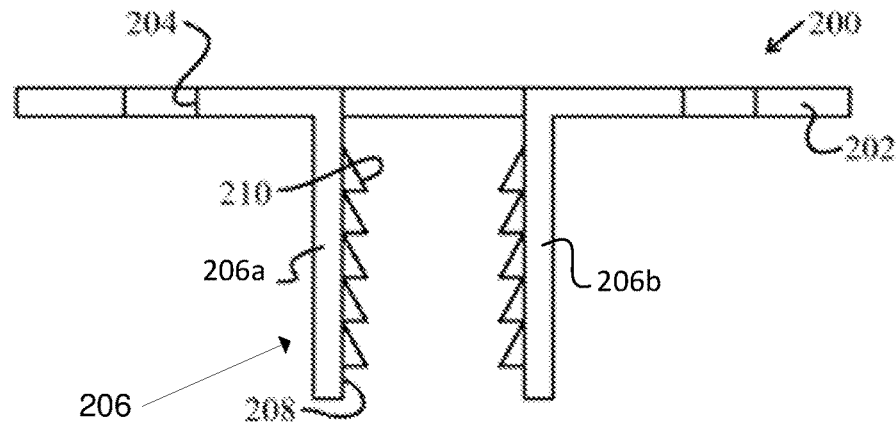
FIG. 4 illustrates a portion of a two-piece fastener according to some embodiments.
Figure 5:
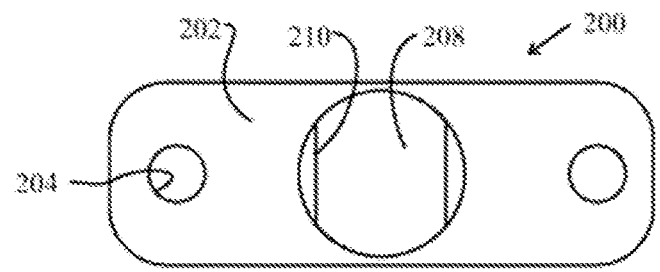
FIG. 5 illustrates a portion of a two-piece fastener according to some embodiments.

FIGS. 4 and 5 illustrate a portion of a two-piece fastener including a locking base 200 including a flange 202 defining mounting holes 204 therein. The flange 202 and mounting holes 204 may be constructed and arranged to mount to a first substrate via additional fasteners such as a nut and bolt combination, rivet, weld, or the like. The locking base 200 may include a tube portion 206 defined by two separate tube walls 206a and 206b that are positioned parallel to each other, and are attached to the flange 202 along respective upper ends and defining a passage 208 therein. A second set of teeth 210 may be disposed on opposite sides of the interior facing surfaces of tube walls 206a and 206b of the tube 206. The second set of teeth 210 may be constructed and arranged to engage with a first set of teeth depicted as 110 in FIGS. 1-3, and which may also be constructed and arranged to disengage with the first set of teeth 110 when the bolt 100 is rotated such that the second set of teeth 210 and the first set of teeth 110 are no longer mechanically engaged with one another. In this way, the bolt may be configured to quickly engage with a locking base 200 via engagement of the first set of teeth and second set of teeth.

Figure 6:
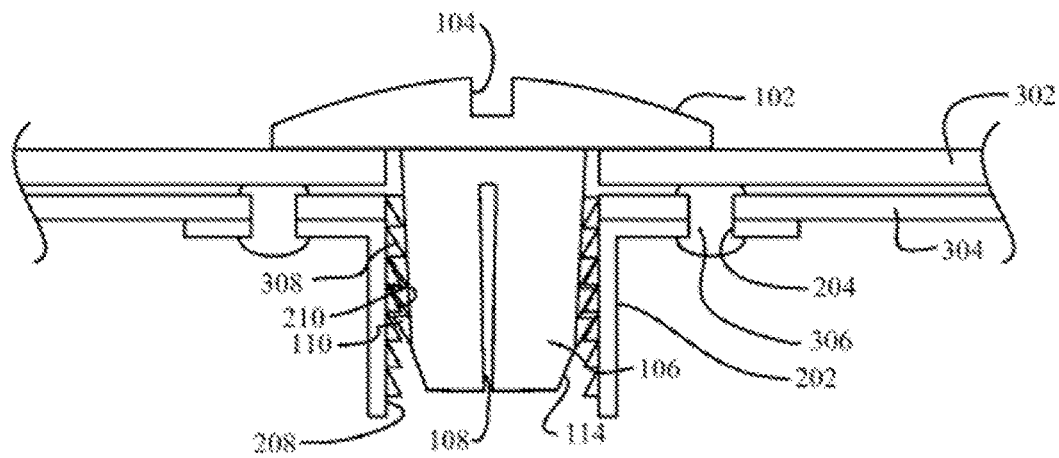
FIG. 6 illustrates a two-piece fastener joining two substrates according to some embodiments.

FIG. 6 illustrates a two-piece fastener joining a first substrate 302 to a second substrate 304, the fastener including a bolt 100 engaged with a locking base 200. The bolt 100 may include a cap 102 which may define a tightening cavity 104 constructed in arranged to receive a tool such as a screwdriver or driver. The cap 102 may have a bottom face 112 joined to a neck 106. The neck 106 may define a compression channel 108 constructed and arranged to allow the neck to reduce diameter when forced into two holes in the first substrate 302 and second substrate 304. The neck 106 may further include a beveled end 114 to further facilitate insertion of the neck into a through hole. The neck 106 may include a first set of teeth 110 on opposite sides of the neck 106. The locking base 200 may include a flange 202 defining mounting holes 204 therein. The flange 202 and mounting holes 204 may be constructed and arranged to mount to the second substrate 304 via additional fasteners 306 such as a nut and bolt combination, rivet, weld, or the like. The locking base 200 may include a tube portion 206 attached to the flange 202 and defining a passage 208 therein. A second set of teeth 210 may be disposed on opposite sides of the interior of the tube 206 to mechanically engage with the first set of teeth 110 at a plurality of interfaces 308.

Figure 7:
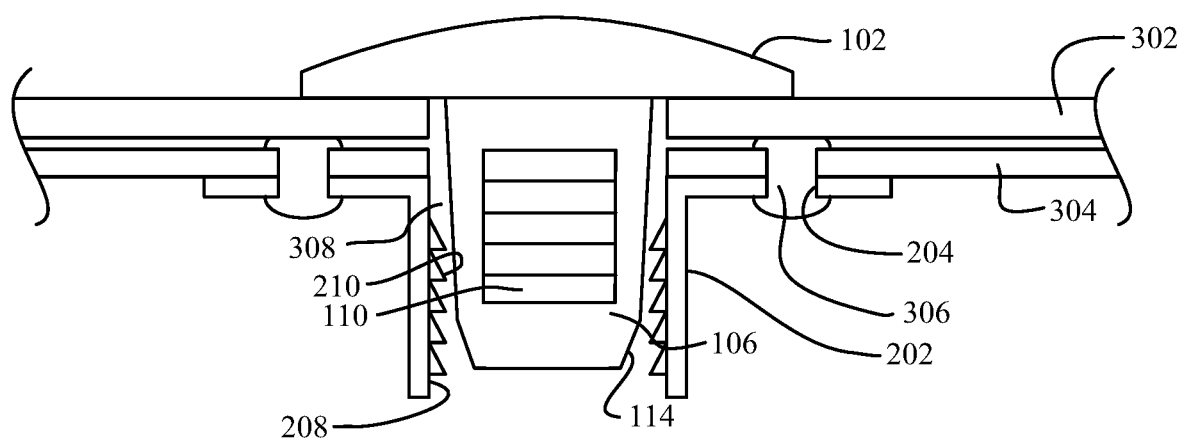
FIG. 7 illustrates a two-piece fastener disengaging two substrates according to some embodiments.

FIG. 7 illustrates a two-piece fastener disengaging a first substrate 302 from a second substrate 304, the fastener including a bolt 100 disengaged with a locking base 200. The bolt 100 may include a cap 102 which may define a tightening cavity 104 constructed in arranged to receive a tool such as a screwdriver or driver. The cap 102 may have a bottom face 112 joined to a neck 106. The neck 106 may define a compression channel 108 constructed and arranged to allow the neck to reduce diameter when forced into two holes in the first substrate 302 and second substrate 304. The neck 106 may further include a beveled end 114 to further facilitate insertion of the neck into a through hole. The neck 106 may include a first set of teeth 110 on opposite sides of the neck 106. The locking base 200 may include a flange 202 defining mounting holes 204 therein. The flange 202 and mounting holes 204 may be constructed and arranged to mount to the second substrate 304 via additional fasteners 306 such as a nut and bolt combination, rivet, weld, or the like. The locking base 200 may include a tube portion 206 attached to the flange 202 and defining a passage 208 therein. A second set of teeth 210 may be disposed on opposite sides of the interior of the tube 206 and, as shown in FIG. 7, are mechanically disengaged from the first set of teeth 110 by rotating the bolt 100 approximately 90 degrees relative to the locking base 200.

The following description of variants is only illustrative of components, elements, acts, product, and methods considered to be within the scope of the disclosure and are not in any way intended to limit such scope by what is specifically disclosed or not expressly set forth. The components, elements, acts, product, and methods as described herein may be combined and rearranged other than as expressly described herein and still are considered to be within the scope of the invention.

According to variation 1, a two-piece fastener may include a bolt including a cap defining a tightening cavity and having a bottom face joined to a neck, the neck including a beveled end opposite the bottom face wherein the neck defines a compression channel partially therein; a first set of teeth disposed on the neck; a locking base including a flange and a tube, the flange defining a through hole and the tube including an inner surface and defining a passage therein in fluid communication with the through hole; and a second set of teeth disposed on the inner surface of the tube.

Variation 2 may include a two-piece fastener as in variation 1, wherein the neck is generally cylindrical.

Variation 3 may include a two-piece fastener as in variations 1 or 2 wherein the two-piece fastener includes at least one of plastic, steel, titanium or any other suitable material(s) conducive to the construction of the fastener pieces Variation 4 may include a two-piece fastener as in any of variations 1 through 3 wherein the two-piece fastener includes metal.

Variation 5 may include a two-piece fastener as in any of variations 1 through 4 wherein the flange defines at least one through hole constructed and arranged to facilitate attachment of the locking base to a substrate.

Variation 6 may include a two-piece fastener as in any of variations 1 through 5 wherein the cap is generally disc shaped.

Variation 7 may include a two-piece fastener as in any of variations 1 through 6 wherein the beveled end is generally truncated cone in shape.

Variation 8 may include a two-piece fastener as in any of variations 1 through 7 wherein the first set of teeth are constructed and engaged to mechanically interface with the second set of teeth to mechanically attach the bolt to the locking base.

Variation 9 may include a two-piece fastener as in any of variations 1 through 8 wherein the first set of teeth are constructed and engaged to mechanically disengage from the second set of teeth by rotating the bolt relative to the locking base.

According to variation 10, a two-piece fastener may include a bolt including a cap defining a tightening cavity and having a bottom face joined to a generally cylindrical neck, the neck including a truncated cone shaped beveled end opposite the bottom face wherein the neck defines a compression channel partially therein; a first set of teeth disposed on the neck; a locking base including a flange and a tube, the flange defining at least one through hole constructed and arranged to facilitate attachment of the locking base to a substrate, the tube including an inner surface and defining a passage therein in fluid communication with the through hole; and a second set of teeth disposed on the inner surface of the tube.

Variation 11 may include a two-piece fastener as in variation 10, wherein the neck is generally cylindrical.

Variation 12 may include a metal two-piece fastener as in variation 10 or 11, wherein the cap is generally disc shaped.

Variation 13 may include a two-piece fastener as in any of variations 10 through 12, wherein the first set of teeth are constructed and engaged to mechanically interface with the second set of teeth to mechanically attach the bolt to the locking base.

Variation 14 may include a two-piece fastener as in any of variations 10 through 13, wherein the first set of teeth are constructed and engaged to mechanically disengage from the second set of teeth by rotating the bolt relative to the locking base.

Variation 15 may include a two-piece fastener as in any of variations 10 through 14, wherein the first set of teeth are generally arc-shaped and generally contour to the circumference of the neck.

Variation 16 may include a two-piece fastener as in any of variations 10 through 15, wherein the second set of teeth are generally arc-shaped and generally contour to an interior surface of the tube.

According to variation 17, a two-piece fastener may include a bolt including a cap defining a tightening cavity and having a bottom face joined to a generally cylindrical neck, the neck including a truncated cone shaped beveled end opposite the bottom face wherein the neck defines a compression channel partially therein; a first set of teeth disposed on the neck, wherein the first set of teeth are generally arc-shaped and generally contour to the circumference of the neck; a locking base including a flange and a tube, the flange defining at least one through hole constructed and arranged to facilitate attachment of the locking base to a substrate, the tube including an inner surface and defining a passage therein in fluid communication with the through hole; and a second set of teeth disposed on the inner surface of the tube, wherein the second set of teeth are generally arc-shaped and generally contour to an interior surface of the tube.

Variation 18 may include a two-piece fastener as in variation 17, wherein the cap is generally disc shaped.

Variation 19 may include a two-piece fastener as in variation 17 or 18, wherein the flange is generally rectangular in shape.

Variation 20 may include a two-piece fastener as in any of variations 17 through 19, wherein the first set of teeth are constructed and engaged to mechanically interface with the second set of teeth to mechanically attach the bolt to the locking base and wherein the first set of teeth are constructed and engaged to mechanically disengage from the second set of teeth by rotating the bolt relative to the locking base.

Several different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations, and even initially claimed as such, it is to be expressly understood that one or more elements from a claimed combination can, in some cases, be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible considering the above teachings without departing from the following claims.

I claim:

1. A two-piece fastener, comprising:
   a bolt comprising a cap defining a tightening cavity and having a bottom face joined to a neck, the neck comprising a beveled end opposite the bottom face wherein the neck defines a compression channel partially therein;
   a first set of teeth disposed on the neck, said first set of teeth comprising a first plurality of serially aligned protrusions located along a first side of the neck, and a second plurality of serially aligned protrusions located along a second side of the neck,
   wherein each of the first plurality of serially aligned protrusions and the second plurality of serially aligned protrusions are located parallel to each other and extend along an entirety of the neck from the bottom face to the beveled end;
   a locking base comprising a flange and a pair of elongated tubes, the flange defining a through hole and each of the tubes comprising an inner surface and defining a passage therein in fluid communication with the through hole; and
   a second set of teeth comprising a first plurality of serially aligned protrusions located along an inside facing surface of one of the pair of tubes, and a second plurality of serially aligned protrusions located along an inside facing surface of the other of the pair of tubes,
   wherein each protrusion of the first set of teeth are configured to removably engage each protrusion of the second set of teeth to secure the bolt within the through hole of the locking base.

2. A two-piece fastener as in claim 1, wherein the neck is generally cylindrical.

3. A two-piece fastener as in claim 1, wherein the two-piece fastener comprises:
   at least one material conducive to the construction of the fastener pieces.

4. A two-piece fastener as in claim 1, wherein the two-piece fastener comprises metal.

5. A two-piece fastener as in claim 1, wherein the flange defines at least one mounting hole constructed and arranged to facilitate attachment of the locking base to a substrate.

6. A two-piece fastener as in claim 1, wherein the cap is generally disc shaped.

7. A two-piece fastener as in claim 1, wherein the beveled end is generally truncated cone in shape.

8. A two-piece fastener as in claim 1, wherein each of the plurality of protrusions in the first set of teeth are constructed and engaged to mechanically interface with each of the plurality of protrusions in the second set of teeth to mechanically attach the bolt to the locking base.

9. A two-piece fastener as in claim 8, wherein each of the plurality of protrusions in the first set of teeth are constructed and engaged to mechanically disengage from each of the plurality of protrusions in the second set of teeth by rotating the bolt relative to the locking base.

10. A two-piece fastener as in claim 1, wherein the pair of elongated tubes are positioned parallel to each other and perpendicular to the flange.

11. A two-piece fastener as in claim 1, wherein the pair of elongated tubes are separated from each other and are connected only to the flange.

12. A two-piece fastener as in claim 1, wherein the compression channel comprises:

a continuous void extending from the bottom face to the beveled end, said continuous void functioning to completely separate the first side of the neck from the second side of the neck.

13. A two-piece fastener, consisting of:

a bolt comprising a cap defining a tightening cavity, a bottom face, and a neck having a continuous void along a center section extending from the bottom face to an open bottom end;

a first set of teeth disposed on the neck, said first set of teeth comprising a first plurality of serially aligned protrusions located along a first side of the neck, and a second plurality of serially aligned protrusions located along a second side of the neck, each of the first plurality of serially aligned protrusions and the second plurality of serially aligned protrusions being located parallel to each other and extending along an entirety of the neck from the bottom face to the beveled end;

a locking base comprising a flange and a pair of elongated tubes, the flange defining a through hole and each of the tubes comprising an inner surface and defining a passage therein in fluid communication with the through hole; and a second set of teeth comprising a first plurality of serially aligned protrusions located along an inside facing surface of one of the pair of tubes, and a second plurality of serially aligned protrusions located along an inside facing surface of the other of the pair of tubes, wherein each protrusion of the first set of teeth are configured to removably engage each protrusion of the second set of teeth to secure the bolt within the through hole of the locking base.

\* \* \* \* \*